United States Patent
Guo et al.

(10) Patent No.: US 7,959,409 B2
(45) Date of Patent: Jun. 14, 2011

(54) REPAIRED VANE ASSEMBLIES AND METHODS OF REPAIRING VANE ASSEMBLIES

(75) Inventors: Wen Guo, Greenville, SC (US); William F. Hehmann, Greer (CN)

(73) Assignee: Honeywell International Inc., Morristown, NJ (US)

( * ) Notice: Subject to any disclaimer, the term of this patent is extended or adjusted under 35 U.S.C. 154(b) by 1139 days.

(21) Appl. No.: 11/680,792

(22) Filed: Mar. 1, 2007

(65) Prior Publication Data

US 2008/0213092 A1      Sep. 4, 2008

(51) Int. Cl.
*F01D 9/00* (2006.01)

(52) U.S. Cl. .............. 415/210.1; 416/229 A; 29/889.2

(58) Field of Classification Search ........... 415/210, 415/224, 229 A, 229 R, 210.1; 29/889.2; 416/224, 229 A, 229 R
See application file for complete search history.

(56) References Cited

U.S. PATENT DOCUMENTS

| | | | | |
|---|---|---|---|---|
| 3,275,295 A | * | 9/1966 | Caldwell et al. | 416/224 |
| 3,394,918 A | * | 7/1968 | Wiseman | 416/241 R |
| 3,574,924 A | * | 4/1971 | Dibble | 228/119 |
| 3,650,635 A | * | 3/1972 | Wachtell et al. | 415/115 |
| 4,214,355 A | * | 7/1980 | Zelahy | 29/889.1 |
| 4,305,697 A | | 12/1981 | Cohen et al. | |
| 4,326,833 A | | 4/1982 | Zelahy et al. | |
| 5,033,938 A | * | 7/1991 | Fraser et al. | 416/224 |
| 5,584,662 A | | 12/1996 | Mannava et al. | |
| 5,697,151 A | | 12/1997 | Werner et al. | |
| 6,394,750 B1 | * | 5/2002 | Hiskes | 415/189 |
| 6,502,303 B2 | | 1/2003 | Updegrove et al. | |
| 6,508,000 B2 | | 1/2003 | Burke et al. | |
| 6,575,702 B2 | | 6/2003 | Jackson et al. | |
| 6,607,114 B2 | * | 8/2003 | Reser et al. | 228/49.1 |
| 6,685,431 B2 | * | 2/2004 | Hiskes | 415/209.4 |
| 6,797,335 B1 | * | 9/2004 | Paderov et al. | 427/530 |
| 2005/0158460 A1 | | 7/2005 | Williams | |
| 2006/0117562 A1 | | 6/2006 | Subramanian et al. | |

* cited by examiner

*Primary Examiner* — Edward Look
*Assistant Examiner* — Sean J Younger
(74) *Attorney, Agent, or Firm* — Ingrassia Fisher & Lorenz, P.C.

(57) ABSTRACT

Methods are provided for repairing a vane assembly, where the vane assembly includes an inner annular housing, an outer annular housing, and a vane extending therebetween. In one embodiment, the method includes removing an identified section of the vane to thereby form a pocket in an inner surface of the outer annular housing, a slot through the inner annular housing, and an edge on the vane, inserting a replacement vane portion with an advanced coating through the formed slot such that a first edge of the replacement vane portion is disposed in the pocket and at least a portion of the first edge is spaced apart from at least a portion of the outer annular housing inner surface, and welding a section of the replacement vane portion to the annular inner annular housing. The repaired vane assembly is also provided.

19 Claims, 5 Drawing Sheets

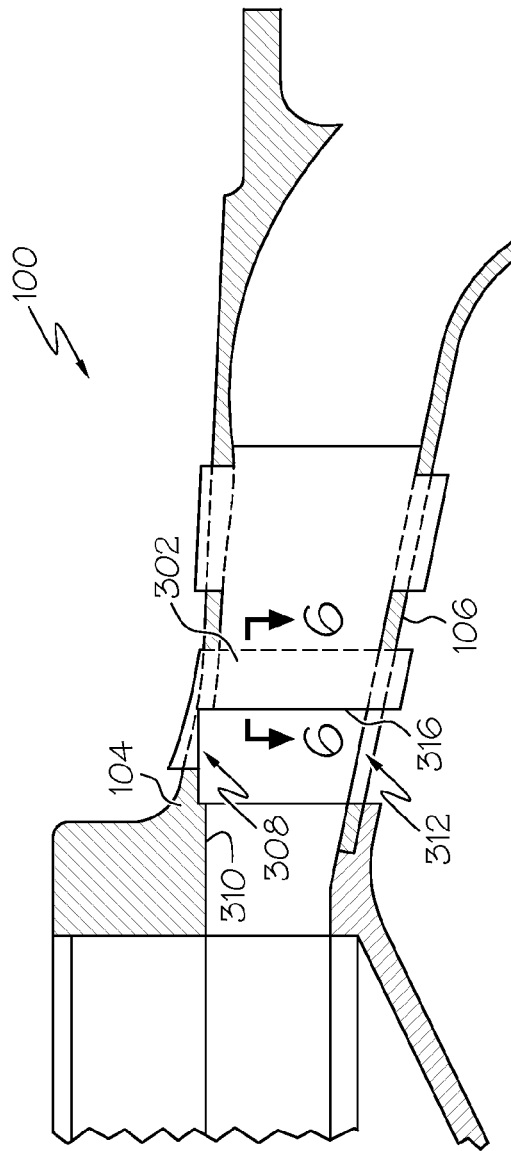
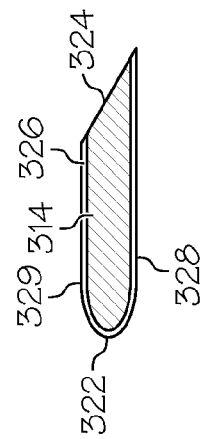
FIG. 4
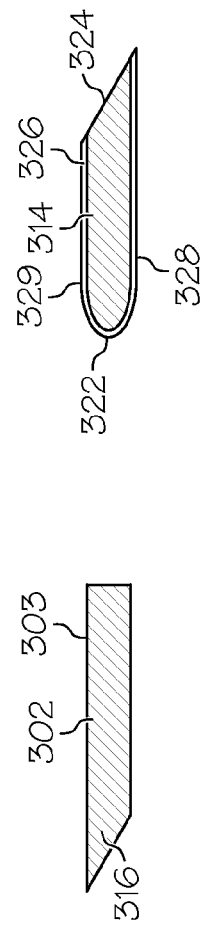
FIG. 6
FIG. 7
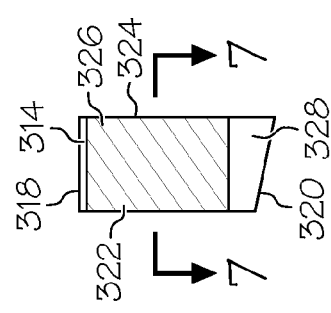
FIG. 5

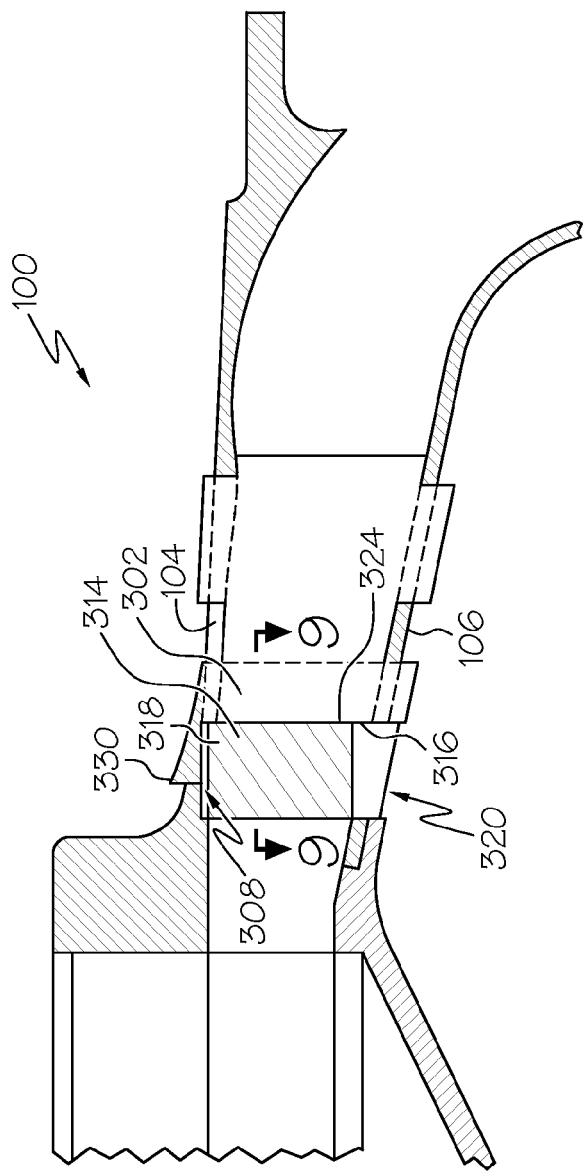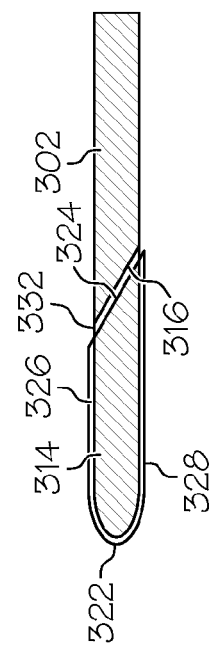

REPAIRED VANE ASSEMBLIES AND METHODS OF REPAIRING VANE ASSEMBLIES

TECHNICAL FIELD

The inventive subject matter relates to vane assemblies and, more particularly, to repaired vane assemblies and methods for repairing vane assemblies.

BACKGROUND

Turbine engines are used as the primary power source for many types of aircraft. Most turbine engines generally follow the same basic power generation procedure. Air is ingested into the fan section of an engine and is directed against at least one set of stationary vanes toward axial and/or radial compressors. The compressed air is mixed with fuel and burned, and the expanding hot combustion gases are directed against another set of stationary vanes in the engine. The vanes deflect the high velocity gas flow so as to impinge on turbine blades mounted on a rotatable turbine disk. The force of the impinging gas causes the turbine disk to spin at high speed to create power.

As mentioned above, stationary vanes are disposed along one or more sections of the air flow path. The stationary vanes may be part of an assembly, such as an air diffuser assembly or other component, and they typically extend between an outer annular housing and an inner annular housing. To improve structural integrity of the assembly, the vanes and housings may be integrally cast. Additionally, the assembly may be made from a superalloy, including, but not limited to, nickel-based, cobalt-based, and iron-based superalloys.

Although integrally cast assemblies offer many advantages, they may have drawbacks. For example, the repair of these assemblies may present challenges. Specifically, foreign objects such as sand, dirt, and other such debris may impinge against a leading edge of a vane and cause damage. However, because the individual vanes are permanently attached to the housings, the damaged vane may not be easily removed for repair. Additionally, the superalloys from which the assemblies may be made are generally difficult to weld successfully. For example, welding techniques often include heating the assembly to high temperatures, ranging from 1800° F. to 2000° F. (980° C. to 1095° C.), which may cause the vanes or housings to experience distorting and deformation rendering the vane unusable for further engine service. Moreover, some vanes have complex leading edge geometries thereby making it difficult to deposit filler or cladding material thereon. Braze repair may be another option, however, precision process control may then be needed to prevent distortion of the assembly under braze thermal cycles.

Hence, a method for repairing a vane assembly is desired that may be used to fully restore the geometry, dimension, and desired properties of degraded vanes. Additionally, it is desirable to repair the vane assembly without causing distortion and/or damage to the vane. Additionally, it is desirable to have a repair method that is less costly as compared to the alternative of replacing worn parts with new ones.

BRIEF SUMMARY

The inventive subject matter provides repair methods and repaired vane assemblies.

In one embodiment, and by way of example only, a method is provided for repairing a vane assembly, where the vane assembly includes an inner annular housing, an outer annular housing, and a vane extending therebetween. The method includes removing an identified section of the vane to thereby form a pocket in an inner surface of the outer annular housing, a slot through the inner annular housing, and an edge on the vane, inserting a replacement vane portion through the formed slot such that a first edge of the replacement vane portion is disposed in the pocket and at least a portion of the first edge is spaced apart from at least a portion of the outer annular housing inner surface, and welding a section of the replacement vane portion to the annular inner annular housing.

In another embodiment, and by way of example only, another method is provided. The method includes removing an identified section of the vane to thereby form a pocket in an inner surface of the outer annular housing, a slot through the inner annular housing, and a beveled edge on the vane, inserting a replacement vane portion through the formed slot such that an outer edge of the replacement vane portion is disposed in the pocket and an aft edge of the replacement vane portion is disposed adjacent to and spaced apart from the beveled edge of the vane, the replacement vane portion having a substantially erosion-resistant and oxidation-resistant coating and the aft edge substantially complementing the vane beveled edge, and welding a section of the replacement vane portion to the inner annular housing.

In still another embodiment, and by way of example only, a repaired vane assembly is provided. The repaired vane assembly includes an outer annular housing, an inner annular housing, and a repaired vane. The outer annular housing has an inner surface and a pocket formed therein. The inner annular housing is disposed proximate the outer annular housing. The repaired vane extends between the outer annular housing and the inner annular housing and includes an original portion and a replacement portion. The original portion is integrally formed with the outer and inner annular housings. The replacement portion includes an outer edge disposed within the outer annular housing pocket and a section welded to the inner annular housing.

Other independent features and advantages of the preferred methods and repaired assembly will become apparent from the following detailed description, taken in conjunction with the accompanying drawings which illustrate, by way of example, the principles of the inventive subject matter.

BRIEF DESCRIPTION OF THE DRAWINGS

FIG. 4 is a cross-sectional view of a vane assembly with the identified section of the original vane removed therefrom, according to an embodiment;

FIG. 5 is a side view of a replacement vane portion that may be used in the repair method shown in FIG. 2, according to an embodiment;

FIG. 6 is a cross-sectional view of the original vane shown in FIG. 4 taken along line 6-6, according to an embodiment;

FIG. 7 is a cross sectional view of the replacement vane portion shown in FIG. 5 taken along line 7-7, according to an embodiment;

FIG. 8 is a cross-sectional view of a vane assembly during another step of the repair method shown in FIG. 2, according to an embodiment; and FIG. 9 is a cross-sectional view of a repaired vane taken along line 9-9 in FIG. 8 during another step of the repair method shown in FIG. 2, according to an embodiment.

DETAILED DESCRIPTION

The following detailed description of the inventive subject matter is merely exemplary in nature and is not intended to limit the inventive subject matter or the application and uses of the inventive subject matter. Additionally, although the inventive subject matter is described as being implemented in the context of an air diffuser assembly, the inventive subject matter may alternatively be implemented as part of any other apparatus having a vane integrally formed between an inner and an outer housing. Furthermore, there is no intention to be bound by any theory presented in the preceding background or the following detailed description.

Figure 1:
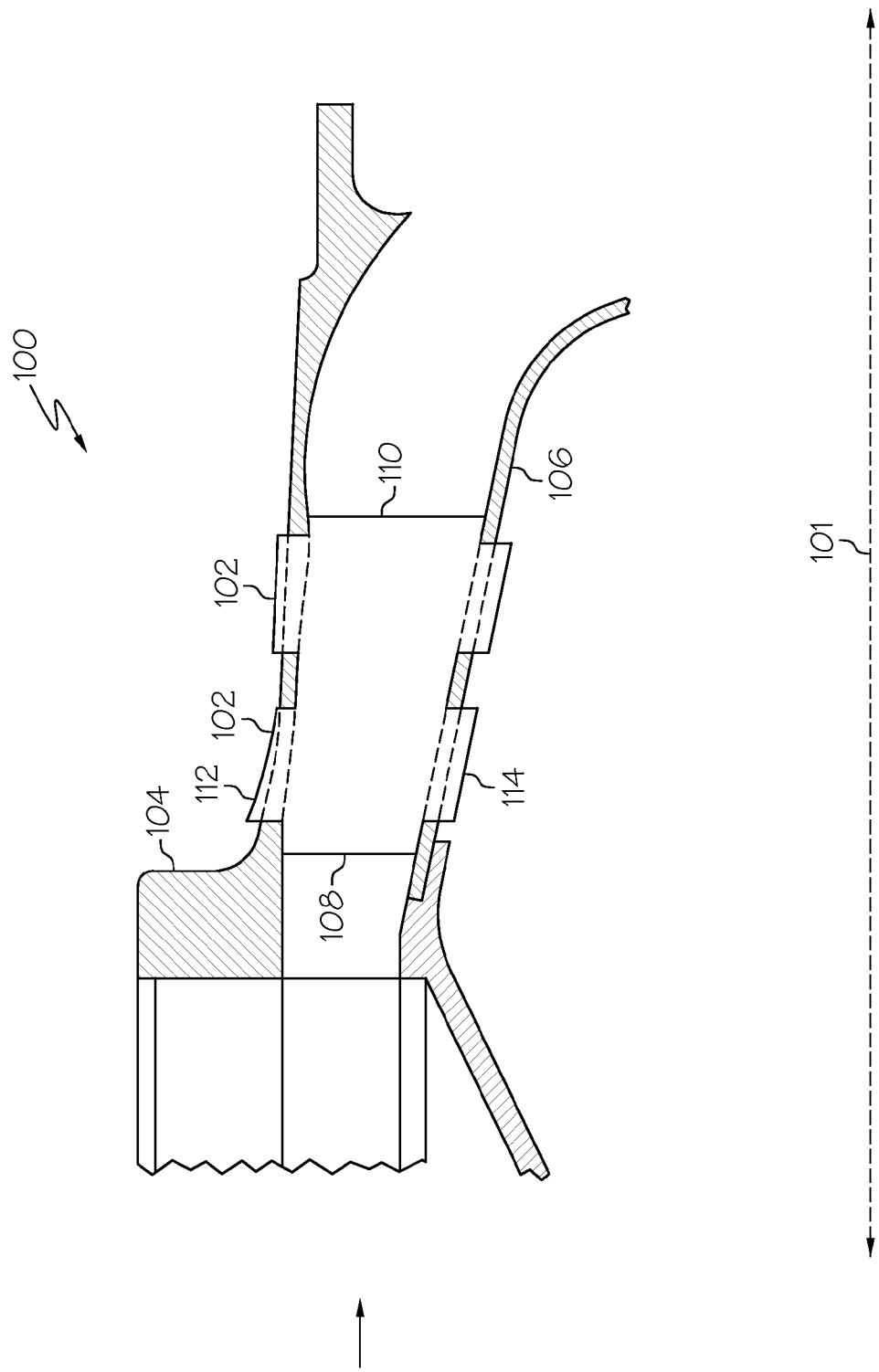
FIG. 1 is a cross-sectional view of a portion of a vane assembly, according to an embodiment.

FIG. 1 is a cross-sectional view of a portion of a vane assembly 100, according to an embodiment. The vane assembly 100 is shown relative to a centerline 101 and may be disposed in an engine (not shown) and used as part of an air diffuser assembly or any component in which air may be directed to flow in a particular direction. The vane assembly 100 includes a plurality of vanes 102 (two of which are illustrated), an outer annular housing 104, and an inner annular housing 106. The vanes 102 extend between and may be integrally cast as part of the outer and inner annular housings 104, 106. The vanes 102, outer annular housing 104, and inner annular housing 106 may be made of a metal alloy, such as, nickel-base superalloy or precipitation stainless steel. Each vane 102 includes a leading edge 108, a trailing edge 110, an outer housing edge 112, and an inner housing edge 114.

Figure 2:
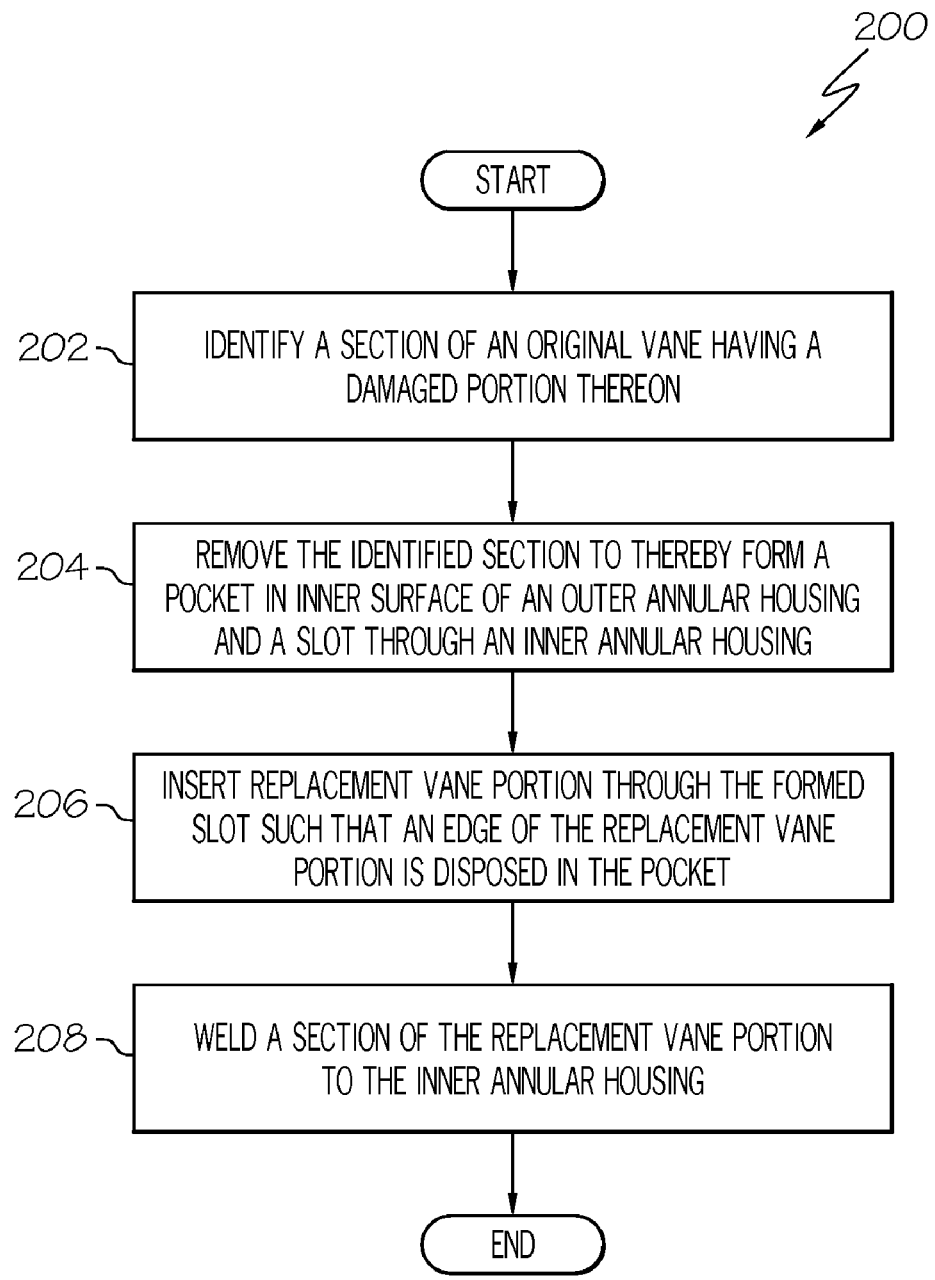
FIG. 2 is a flow diagram of a method of repairing a vane assembly, according to an embodiment.

During engine operation, foreign objects such as sand, dirt, and other such debris may impinge against the vane assembly 100. Over time, a portion of the vane assembly 100, such as the vane leading edge 108, may become degraded. Thus, the vane assembly 100 may undergo repair. FIG. 2 is a flow diagram of a method of repairing the vane assembly 100, according to an embodiment. The method 200 includes identifying a section of an original vane having a damaged portion thereon, step 202. Next, the identified section is removed to thereby form a pocket in an inner surface of the outer annular housing 104 and a slot through the inner annular housing 106, step 204. A replacement vane portion is inserted through the formed slot such that an edge of the replacement vane portion is disposed in the pocket, step 206. A section of the replacement vane portion is then welded to the inner annular housing 106, step 208. Each of these steps will now be discussed in detail.

Figure 3:
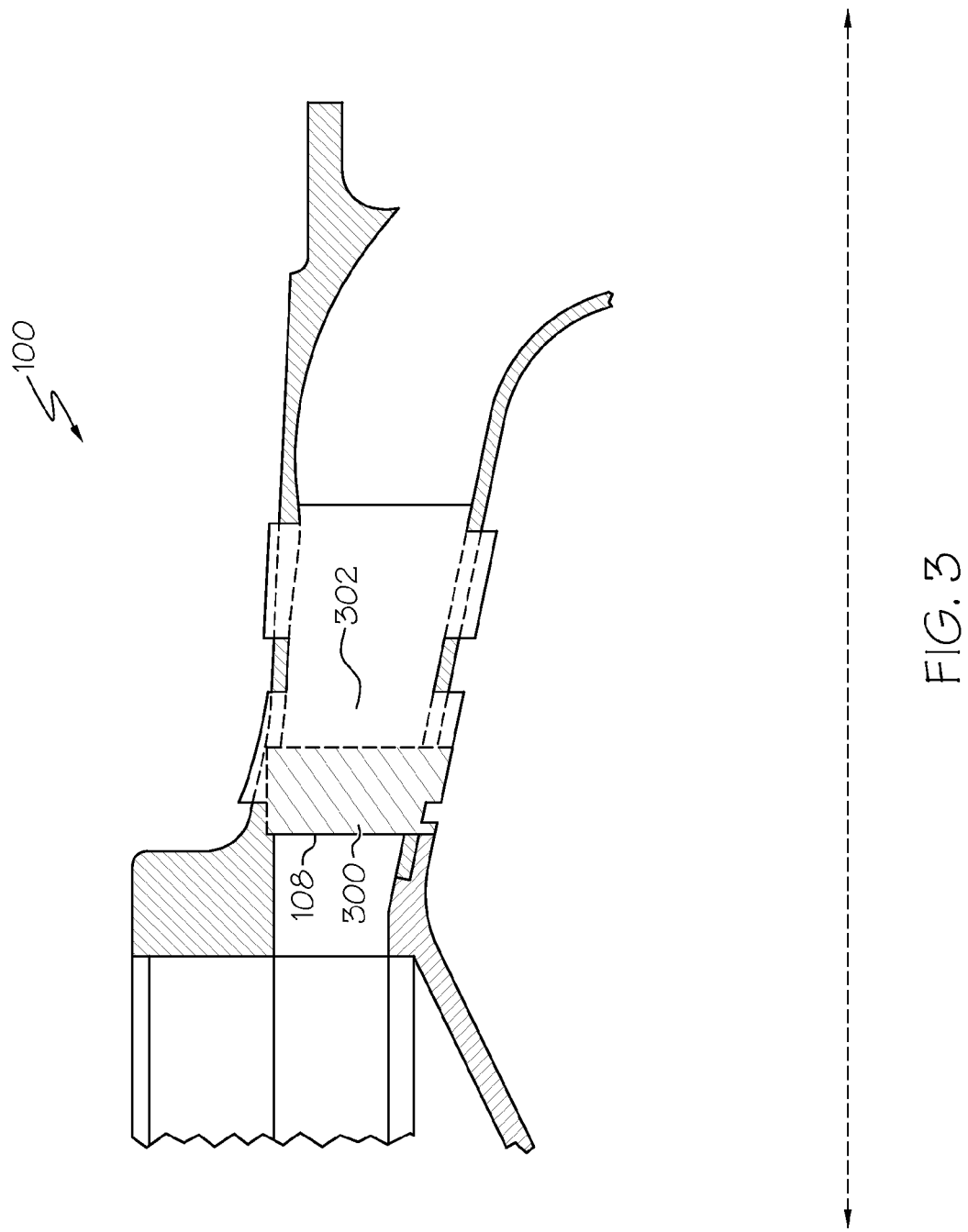
FIG. 3 is a cross-sectional view of a vane assembly identifying a section of an original vane to be removed, according to an embodiment.

As briefly mentioned above, a section to be removed from an original vane is first identified, step 202. FIG. 3 is a cross-sectional view of the vane assembly 100 identifying a section 300 of the original vane 302 to be removed, according to an embodiment. The identified section 300 includes the damaged portion of the original vane 302 and has an axial length measured from the damaged portion to another part of the original vane 302. In an embodiment, the damaged portion is on the leading edge 108 of the original vane 302.

The identified section 300 of the original vane 302 is then removed such that a pocket 308 is formed in an inner surface 310 of the outer annular housing 104 and a slot 312 is formed through the inner annular housing 106 (step 204), as shown in FIG. 4. The identified section 300 may be removed using a conventional machining process. For example, an electrical discharge machining process may be employed. In an electrical discharge machining process, a wire electrode may be contacted with the original vane 302 and an electrical discharge may be passed therebetween to thereby cut through the original vane 302. The wire electrode may be a straight wire, or may be shaped substantially similarly to the identified section 300 or to a replacement vane portion 314 (shown in FIG. 5).

In an embodiment, the wire electrode may cut through a portion of the inner annular housing 106 located radially inwardly from the identified section 300. The cut may form the slot 312. The slot 312 may have a length and a width that are substantially equal to or greater than the axial length and width of the identified section 300. The wire electrode may then cut through the original vane 302 to thereby remove the identified section 300. FIG. 6 is a cross-sectional view of the cut original vane 302 shown in FIG. 4 taken along line 6-6. In an embodiment, the identified section 300 may be removed such that a radially extending forward edge 316 is formed on the original vane 302. In another embodiment, the forward edge 316 may be beveled. For example, the forward edge 316 may be beveled at a 45° relative to a surface 303 of the original vane 302. In another embodiment, the forward edge 316 may be beveled at other angles in a range from about 30° to about 60° relative to the surface 303 of the original vane 302. The wire electrode may then erode a portion of the outer annular housing inner surface 310 to form the pocket 308. The pocket 308 may have a length that may be equal to or greater than an axial length of the identified section 300.

Next, a replacement vane portion 314 is inserted through the slot 312 such that an edge of the replacement vane portion 314 is disposed in the pocket 308, step 206. FIGS. 5 and 7 provide a side view and a cross-sectional view of the replacement vane portion 314 along line 7-7 in FIG. 5, according to an embodiment. The replacement vane portion 314 is shaped similarly to the removed section of the original vane 302 and includes an outer edge 318, an inner edge 320, a leading edge 322, and an aft edge 324. The aft edge 324 is shaped to substantially complement the shape of the forward edge 316 of the original vane 302 after the damaged section has been removed. In this regard, the aft edge 324 may be beveled to an angle, such as, for example, 45° relative to a side surface 328.

To improve the erosion resistance properties, at least a portion of the replacement vane portion 314 may include a coating 326 of a substantially erosion- and/or oxidation-resistant material. In an embodiment, the coating 326 may be included on the leading edge 322 and both side surfaces 328, 329 of the replacement vane portion 314, while the outer edge 318, the inner edge 320, and the aft edge 324 may not be coated. In an embodiment, the coating 326 may be made of titanium nitride (TiN).

Turning now to FIG. 8, a cross-sectional view of the vane assembly 100 is shown including the replacement vane portion 314 disposed therein. In an embodiment, the replacement vane portion 314 may be disposed within the pocket 308 without being attached to the outer annular housing 104. In another embodiment, the replacement vane portion 314 may be disposed such that at least a portion of the outer edge 318 may be sufficiently spaced apart from the outer annular housing inner surface 310 to thereby form a gap 330 therebetween. The gap 330 may be configured to accommodate radial expansion that may occur when the replacement vane portion 314 is exposed to a sufficiently high temperature.

Additionally, the replacement vane portion 314 and original vane 302 may be disposed such that the two are adjacent to and spaced apart from each other. FIG. 9 is a cross-sectional view of the replacement vane portion 314 and original vane 302 taken along line 9-9, according to an embodiment. In this embodiment, the aft edge 324 of the replacement vane portion 314 and the forward edge 316 of the original vane 302 are spaced apart to form a gap 332 therebetween. The gap 332 may be included to provide minimal flow disruption of air traveling across the surfaces of the replacement vane portion 314 and the original vane 302.

Returning to FIG. 8, a section of the replacement vane portion 314 is then welded to the annular inner housing 106, step 208. The second section may include the inner edge 320 or a portion of the replacement vane portion 314 that is proximate the inner edge 320. In an embodiment, the second section and inner annular housing 106 are laser welded together. The second section and inner annular housing 106 may be welded together using a conventional hand-held laser weld apparatus. In other embodiments, the second section and inner annular housing 106 may be welded using a tungsten inert gas welding process, or some other welding process.

A method has now been provided that may be used to repair integrally formed vane assemblies. The method may be simple and inexpensive to perform may be used to fully restore geometry, dimension and desired properties of degraded vanes. Additionally, the method may allow control of welding parameters so that assembly repairs may be affected without distortion and damage to the vane. Moreover, the method may be less costly as compared to the alternative of replacing a damaged vane assembly with a new assembly.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A method of repairing a vane assembly, the vane assembly including an inner annular housing, an outer annular housing, and a vane extending therebetween, the method comprising the steps of:
   removing an identified section of the vane to thereby form a pocket in an inner surface of the outer annular housing, a slot through the inner annular housing, and an edge on the vane;
   inserting a replacement vane portion through the formed slot such that a first edge of the replacement vane portion is disposed in the pocket and at least a portion of the first edge is spaced apart from at least a portion of the outer annular housing inner surface; and
   welding a section of the replacement vane portion to the annular inner annular housing.

2. The method of claim 1, wherein the step of inserting the replacement vane portion comprises inserting a replacement vane portion including a substantially erosion-resistant and oxidation-resistant coating comprising TiN.

3. The method of claim 1, wherein:
   the step of removing the identified section comprises beveling the edge on the vane; and
   the step of inserting the replacement vane portion comprises disposing a second edge of the replacement vane portion adjacent to and spaced apart from the beveled edge on the vane, the replacement vane portion second edge having a bevel that substantially complements the beveled edge on the vane.

4. The method of claim 3, wherein:
   the step of removing the identified section comprises beveling the vane edge on the vane to an angle of between about 30° to about 60° relative to a vane surface.

5. The method of claim 1, wherein the step of welding comprises laser welding the section of the replacement vane portion to the inner annular housing.

6. The method of claim 5, wherein the step of welding comprises hand-held laser fusion welding the section of the replacement vane portion to the inner annular housing.

7. The method of claim 1, wherein the step of welding comprises tungsten inert gas welding the section of the replacement vane portion to the inner annular housing.

8. The method of claim 1, wherein the step of removing comprises electrical discharge machining the vane.

9. A method of repairing a vane assembly, the vane assembly including an inner annular housing, an outer annular housing, and a vane extending therebetween, the method comprising the steps of:
   removing an identified section of the vane to thereby form a pocket in an inner surface of the outer annular housing, a slot through the inner annular housing, and a beveled edge on the vane;
   inserting a replacement vane portion through the formed slot such that an outer edge of the replacement vane portion is disposed in the pocket and an aft edge of the replacement vane portion is disposed adjacent to and spaced apart from the beveled edge of the vane, the replacement vane portion having a substantially erosion-resistant and oxidation-resistant coating and the aft edge substantially complementing the vane beveled edge; and
   welding a section of the replacement vane portion to the inner annular housing,
   wherein a portion of the replacement vane portion outer edge is spaced apart from the outer annular housing inner surface to form a gap therebetween.

10. The method of claim 9, wherein:
    the step of removing the identified section comprises beveling the edge on the vane to between about 30° to about 60° relative to a vane surface.

11. The method of claim 9, wherein the step of welding comprises laser welding the section of the replacement vane portion to the annular inner housing.

12. The method of claim 11, wherein the step of welding comprises hand-held laser fusion welding the section of the replacement vane portion to the inner annular housing.

13. The method of claim 9, wherein the step of welding comprises tungsten inert gas welding the section of the replacement vane portion to the inner annular housing.

14. The method of claim 9, wherein the step of removing comprises electrical discharge machining the vane.

15. A repaired vane assembly comprising:
    an outer annular housing having an inner surface and a pocket formed therein;
    an inner annular housing disposed proximate the outer annular housing; and
    a repaired vane extending between the outer annular housing and the inner annular housing, the repaired vane including an original portion and a replacement portion, the original portion integrally formed with the outer and inner annular housings, and the replacement portion including an outer edge disposed within the outer annular housing pocket and a section welded to the inner annular housing,
wherein a portion of the replacement portion outer edge is spaced apart from the outer annular housing inner surface to form a gap therebetween.

16. The repaired vane assembly of claim 15, wherein the original portion includes a radially extending edge and the replacement portion includes an aft edge that substantially complements the radially extending edge and is disposed adjacent thereto and spaced apart therefrom.

17. The repaired vane assembly of claim 16, wherein the radially extending edge is beveled.

18. The repaired vane assembly of claim 17, wherein the beveled radially extending edge of the original portion is angled between about 30° to about 60° relative to a surface of the original portion.

19. The repaired vane assembly of claim 15, wherein the replacement portion includes a TiN coating thereon.

* * * * *